Sept. 2, 1924.
M. C. REYNOLDS
MARGARINE AND THE PROCESS OF MAKING SAME
Filed Feb. 26, 1921
1,507,426
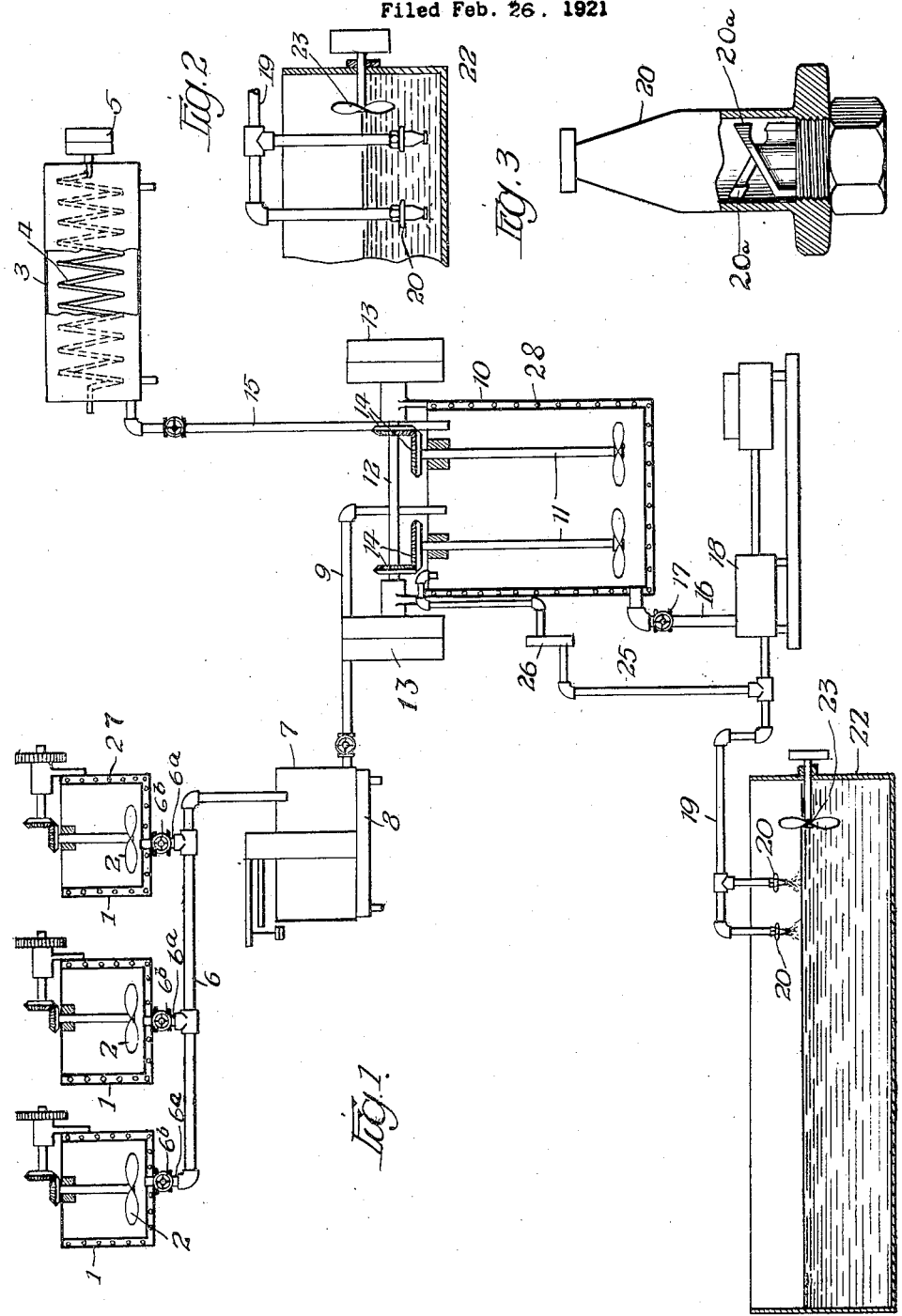

Patented Sept. 2, 1924.

1,507,426

UNITED STATES PATENT OFFICE.

MARVIN C. REYNOLDS, OF OAK PARK, ILLINOIS.

MARGARINE AND THE PROCESS OF MAKING SAME.

Application filed February 26, 1921. Serial No. 447,984.

*To all whom it may concern:*

Be it known that I, MARVIN C. REYNOLDS, a citizen of the United States, residing at Oak Park, in the county of Cook and State of Illinois, have invented a certain new and useful Improvement in Margarine and the Process of Making Same, of which the following is a specification.

This invention relates to a new and improved process of making margarine and the product formed by this process. My invention has among other objects to provide a process of discharging the liquid emulsion formed from a fatty substance and ripened milk and crystallizing it in such a manner that substantially uniform small crystalline aggregates are obtained which give a uniform homogeneous mass in the finished product, eliminating the comparatively light lumpy spots now found in margarine as manufactured by the processes at present in use.

A further object of my invention is to provide a process of crystallizing the liquid emulsion produced from the fatty substance and the milk so as to instantaneously produce small, uniform crystalline aggregates which retain a larger portion of the solid milk constitutents in the finished product.

A further object of my invention is to produce a margarine which will have a uniform, velvet-like texture and good spreading qualities.

My invention has other objects which are more fully set out in the following description.

Referring now to the accompanying drawings:

Fig. 1 is a diagrammatic view showing one form of apparatus for carrying out the process;

Fig. 2 is a view showing the nozzles submerged;

Fig. 3 is an enlarged view of one form of nozzle.

In carrying out the invention I take any of the suitable fatty substances, such as the edible animal or vegetable oils or fats which are now used in making margarine, and add cultured or ripened milk, either naturally or artificially prepared, the milk assisting in the emulsification and giving the desired flavor and aroma to the finished product. The fatty substance or substances are placed in melting receptacles 1, where they are melted and brought to the proper temperature, and preferably stirred while heated, by a stirrer 2. The ripened milk is contained in the tank or receptacle 3, which is preferably provided with a temperature varying device such as a coil 4 containing temperature varying material, the coil being rotated in the receptacle by means of the pulley 5. The receptacles 1 are connected by a suitable conduit 6 with a weighing tank 7, which is placed on a scale 8 for the purpose of measuring the amounts of various oils and fats which go to make up the margarine. The pipes 6ᵃ leading from the receptacles to the conduits 6 are provided with suitable valves 6ᵇ. The receptacle 7 is connected by a suitable conduit 9 with the churn or emulsifier 10, which is equipped with the agitators 11 which are operated in any desired manner, as from the shaft 12 driven by the pulley 13 and the gears 14. The receptacle 3 containing the milk is connected by a conduit 15 with the churn or emulsifier 10. The materials are placed in proper proportions in the churn or emulsifier, and the proper emulsion produced. After the ingredients are properly emulsified they are fed through a conduit 16 controlled by a valve 17 to the pump or the like 18. They are then forced under pressure through the conduit 19 to the spray nozzle or nozzles 20. The spray nozzle or nozzles break up the emulsion into discrete particles. This finely divided material is forced directly upon the surface of the cooling liquid, such as water, in a receptacle 22. The material in this finely divided state therefore is instantly brought into contact with this cold liquid and is therefore instantly cooled. The finely divided particles have no time to coalesce. These fine particles are also more or less momentarily submerged in the cooling liquid and it will thus be seen that they are instantaneously changed to solid form, forming small crystals and crystalline aggregates. I have found that this instantaneous action on these fine particles causes them to retain substantially all of the milk. This therefore produces a much better article and increases the flavor, and if desired permits the use of a smaller quantity of milk, thus saving the milk.

Some means is provided for removing the margarine on the surface of the liquid so that it will not interfere with the action of the nozzles 20. I may, for example, place a revolving paddle wheel 23 in the tank which agitates the cold liquid medium in the receptacle and thus carries the margarine to the other end of the receptacle from which it is removed and placed in trucks.

I have described a process wherein milk is used as the emulsifying agent, but I do not limit myself to milk as other emulsifying agents may be used.

I provide some means to relieve the pressure when the pump tends to pump more material than can be taken care of by the nozzles. In the construction shown this is provided for by arranging a pipe 25 which connects with pipe 19 which leads back to the emulsifier 10. This pipe is provided with a release valve 26. It will be seen that when the pressure increases beyond a predetermined amount, a portion of the liquid will be forced back through pipe 25 and valve 26 into the emulsifier 10. I may also submerge the nozzles 20 below the surface of the water as shown for example in Fig. 2. The material is then forced out of the nozzle into discrete particles and comes directly into contact with the cold water and is converted into small crystalline aggregates as hereinbefore set out. When the nozzles are placed under the surface of the water it is not necessary to provide the stirrer or wheel 23.

By means of this invention it will be seen that the emulsified liquid is separated into a finely divided state, and these particles are instantly cooled while in this finely divided state, and this produces substantially uniform, small, crystalline aggregates, resembling snowflakes in their physical appearance.

In the process heretofore used comparatively large particles are formed of non-uniform size, thus forming a product of non-homogeneous physical consistency and filled with hard lumps or particles. By separating the liquid emulsion into this finely divided state before it impinges upon the liquid surface of the cold fluid medium, all these difficulties are avoided, and a uniform, smooth product is produced. By means of my invention also substantially all of the milk is retained in the margarine, thus giving it a better flavor and increasing its value, and at the same time saving the milk which in the other methods is lost.

I further find that in working the small snowflake like crystals produced by my invention, to squeeze out the adhering moisture and reducing the mass to the consistency of creamery butter, there is substantially no tendency for the milk to wash out.

The melting receptacles 1 may be heated in any desired manner, as by means of a steam jacket. I have illustrated one arrangement of this kind containing the steam pipes 27. The churn 10 may also have a steam jacket and similar steam pipes 28. Any desired form of nozzle may be used and I have illustrated in Fig. 3 a simple form having no moving parts, the interior thereof being provided with the rings 20ª which act in conjunction with the casing of the nozzle to produce the spray.

I claim:

1. The process of manufacturing margarine which consists in forming a warm liquid emulsion from fatty substances and milk and reducing this emulsion into discrete particles by pressure, and then by instantaneously bringing it to contact with a cooling liquid suddenly forming small crystals and crystalline aggregates from said finely divided material.

2. The process of manufacturing margarine which consists in forming a warm liquid emulsion of fatty substances and milk and reducing this emulsion by pressure into discrete particles, and then allowing the material in this finely divided state to forcibly impinge upon the surface of a relatively colder liquid so as to instantaneously change the liquid emulsion into solid finely divided particles.

3. The process of manufacturing margarine which consists in forming a warm liquid emulsion of fatty substances and milk and reducing this emulsion into discrete particles and then allowing the material in this finely divided state to forcibly impinge upon the surface of a relatively colder liquid while still in a liquid form, and causing it to be momentarily submerged so as to instantaneously form it into practically uniform crystals and crystalline aggregates.

4. The process of manufacturing margarine which consists in forming a liquid emulsion from fatty substances and an emulsifying agent and reducing this emulsion into discrete particles, and then suddenly bringing the emulsion while in this finely divided state into contact with a colder liquid.

5. An article of food consisting of an intimate mixture of fatty substances and milk in which the ingredients are formed into small, substantially uniform crystals and crystalline aggregates, thereby producing a homogeneous substance of a velvety like smooth nature free from spots or lumpy particles, and retaining substantially all of the milk solids.

6. The process of manufacturing margarine which consists in forming a liquid emulsion from fatty substances and ripened milk, then separating said emulsion into discrete particles while in a liquid state and forcibly impinging said particles upon a cold liquid medium, maintaining the particles in a liquid state until they strike the liquid medium, whereby said particles are instantly solidified and become stabilized, and then moving these particles out of the way of the following particles.

Signed at Chicago, county of Cook, and State of Illinois, this 16th day of February, 1921.

MARVIN C. REYNOLDS.